G. F. BUTTERFIELD.
COMPOSITE SOLE AND SOLING MATERIAL.
APPLICATION FILED DEC. 22, 1913.
1,116,009.
Patented Nov. 3, 1914.
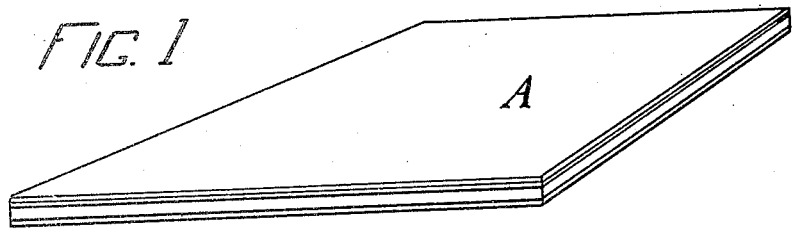
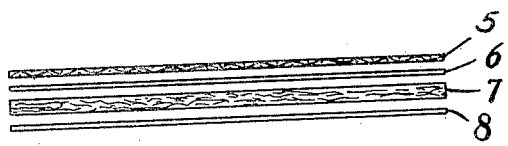
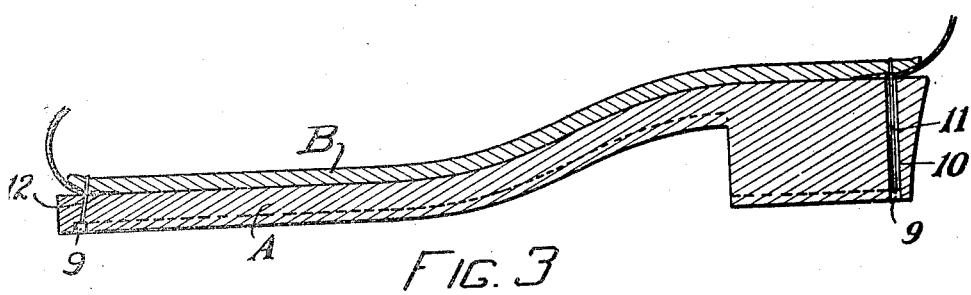
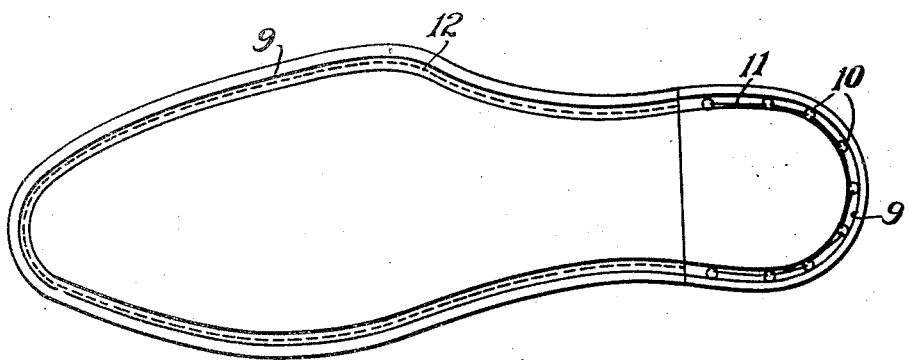
WITNESSES
INVENTOR
GEORGE F. BUTTERFIELD
BY
ATT'Y.

UNITED STATES PATENT OFFICE.

GEORGE F. BUTTERFIELD, OF WEST NEWTON, MASSACHUSETTS.

COMPOSITE SOLE AND SOLING MATERIAL.

1,116,009.  Specification of Letters Patent.  Patented Nov. 3, 1914.

Application filed December 22, 1913. Serial No. 808,214.

*To all whom it may concern:*

Be it known that I, GEORGE F. BUTTERFIELD, of West Newton, in the county of Middlesex and State of Massachusetts, have invented certain new and useful Improvements in Composite Soles and Soling Material, of which the following is a specification.

The object of this invention is the production of a new and useful composite soling material, water-proof in character, flexible and resilient, and adapted for use in the manufacture of boots and shoes generally. This material I make up in sheets of any desired length or thickness and also in the form of soles and of soles and heels.

In the drawing, Figure 1 represents, in perspective, a slab or block of my soling material; Fig. 2 is a diagram showing the successive layers to be united in its manufacture; Fig. 3 is a diagrammatic section showing the application of these soles and heels to a shoe, and Fig. 4 a bottom plan thereof.

My improved soling material A, Fig. 1, is of the following composite structure, viz: a foundation sheet 5 of strong textile fabric suitably cleansed from grease or oily substances by boiling in a strong solution of borax, potash or other grease destroying liquid, or by immersing in naphtha, bisulfate of carbon, ether, wood-alcohol or other cleaners. When these are thoroughly dried out I cover the fabric with heavy coatings of vulcanizable rubber cement by passing it once or twice through the cement so as to thoroughly saturate the fabric, and then between pressure rollers to force in the liquid and express the surplus. I then apply over this prepared material a thin layer or sheet 6 of vulcanizable rubber compound and roll it firmly on and into the meshes of the foundation fabric, which fabric in the shoe, is next to the inner sole B, Fig. 3. Furthermore I greatly strengthen this soling material and somewhat cushion it by incorporating with and into it a layer 7, of strong animal or vegetable fiber such as animal hair, jute, flax, hemp or other string-like material, thoroughly cleansed and mixed with rubber cement and rolled or pressed into the vulcanizable substances. This is most conveniently done by using an additional sheet 8 of the compounded rubber upon which the fibrous matter, thoroughly mixed with the cement, is spread as equally as may be and by roller pressure, made into a sheet of flat cushion form, the fibrous matter coming between the two layers of vulcanizable rubber,—all being subsequently united into one firm body, adapted for soling and other purposes, by the heat and pressure of vulcanization. The outermost layer 8 forms the bottom of the sole and may be roughened or corrugated by shaping the vulcanizing mold accordingly. This composite material A, may be cut into sole form by dies or band-cutters and worked into boots and shoes in lieu of leather or other substances. In case of partial vulcanization while in sheet form the soles cut therefrom may have their edges bound with strips of vulcanizable rubber before subjecting them to the final heat. Soles and heels may be formed, in one, from this improved material in suitable molds, and firmly united to each other and to the shoe by vulcanization with finished edges to avoid showing the material in section. In making up this material in sole and heel form I provide, near the sole and heel edges, deep, narrow channels to receive the thread or other fastening, for its protection against wear by direct contact with the ground. Thus sunken the fastening knot cannot become untied. The heel-portion of the sole has vertical holes 10 intersecting such channels to receive the permanent fastening means 11 which unite it to the shoe. The edgewise seam 12 which unites the sole marginally to the shoe is indicated in Figs. 3 and 4. This new and improved sole and heel, as an integral structure, may be then firmly vulcanized to the bottom of the inner sole of the boot or shoe or otherwise secured in its working position. It will be understood that all the rubber parts are in a vulcanizable condition when first assembled and that subsequent vulcanization permanently unites them.

I claim as my invention:

1. A composite water-proof material for shoe soles, embodying a substantial upper layer of textile fabric free from grease and saturated with rubber cement, a layer of rubber compound pressed into the most intimate contact with such layer, a cushioning body of strong fibrous material intimately intermixed and saturated with rubber cement and an outer, bottom layer formed of rubber compound, such rubber parts being vulcanizable when first assembled and all being permanently united into one integral body by vulcanization, substantially as set forth.

2. Composite shoe-soling material, made in sole and heel form, embodying an upper layer of strong textile fabric saturated with rubber cement, a coating of rubber compound in intimate contact with such fabric, a cushioning layer formed of animal hair thoroughly intermixed with heavy rubber cement, and a bottom layer of rubber compound forming the outer layer of the sole, the rubber parts being vulcanizable when assembled and all being permanently united by subsequent vulcanization, substantially as set forth.

3. A composite shoe sole and heel formed as an integral structure and embodying a substantial upper sheet of textile fabric coated on its under side with rubber cement and having a sheet of rubber compound applied thereto, a cushioning body or layer of fibrous or string-like material, thoroughly intermixed with strong rubber cement, and a bottom or outer layer of rubber compound covering said material, such rubber parts being vulcanizable when first assembled and all subsequently vulcanized firmly together, the sole and heel margins being deeply grooved to receive the fastenings for uniting the sole to the shoe body and the heel having vertical perforations extending through it and intersecting such groove to receive the heel fastenings, substantially as set forth.

In testimony whereof I have affixed my signature, in presence of two witnesses.

GEORGE F. BUTTERFIELD.

Witnesses:
ALICE I. CRAWFORD,
A. T. PALMER.